United States Patent
Chilton et al.

(10) Patent No.: US 7,041,158 B1
(45) Date of Patent: May 9, 2006

(54) PRE-MOLDED AIR FILTER END CAP AND METHOD OF MANUFACTURING AN AIR FILTER

(75) Inventors: Donald Troy Chilton, Gastonia, NC (US); Mitchell Jerome Baker, Lincolnton, NC (US)

(73) Assignee: Wix Filtration Corp., Gastonia, NC (US)

( * ) Notice: Subject to any disclaimer, the term of this patent is extended or adjusted under 35 U.S.C. 154(b) by 302 days.

(21) Appl. No.: 10/437,242

(22) Filed: May 14, 2003

(51) Int. Cl.
*B01D 46/02* (2006.01)
*B01D 50/00* (2006.01)

(52) U.S. Cl. .............. 95/273; 55/482; 55/498; 55/499; 55/500; 55/501; 55/502; 55/510; 55/511; 55/DIG. 5

(58) Field of Classification Search .......... 55/498, 55/499, 500, 501, 516, 511, DIG. 5, 502, 55/482; 210/484, 493.1, 493.2, 497.01; 156/60, 156/303.1; 264/DIG. 48; 95/273
See application file for complete search history.

(56) References Cited

U.S. PATENT DOCUMENTS

| | | | |
|---|---|---|---|
| 2,815,088 A * | 12/1957 | Gibel | 55/510 |
| 3,026,609 A * | 3/1962 | Bryan | 55/510 |
| 3,063,888 A * | 11/1962 | Howard et al. | 55/DIG. 5 |
| 3,415,384 A | 12/1968 | Kasten | |
| 4,036,616 A * | 7/1977 | Byrns | 55/498 |
| 4,082,071 A | 4/1978 | Jones | |
| 4,124,360 A * | 11/1978 | Berger et al. | 55/487 |
| 4,392,958 A * | 7/1983 | Ganzi et al. | 264/DIG. 48 |
| 4,865,738 A * | 9/1989 | Black et al. | 55/500 |
| 5,344,559 A | 9/1994 | Van Ooijen | |
| 5,605,555 A * | 2/1997 | Patel et al. | 55/510 |
| 5,803,941 A | 9/1998 | Berkhoel et al. | |
| 6,387,142 B1 * | 5/2002 | Pieciak et al. | 55/510 |
| 6,712,870 B1 * | 3/2004 | Stamey et al. | 55/498 |
| 2004/0025485 A1 * | 2/2004 | Lee | 55/498 |
| 2004/0040274 A1 * | 3/2004 | Amann | 55/498 |

* cited by examiner

*Primary Examiner*—Jason M. Greene
(74) *Attorney, Agent, or Firm*—Berenato, White & Stavish LLC

(57) ABSTRACT

The end cap (2) comprises a cylindrical gasket-type fitting formed of soft, malleable material. The end cap (2) is connected to the end of an air filter (1) with an adhesive (6). The end cap has a general "U" shaped end portion that encases one end of the air filter (1), and includes a locking tab (7). The locking tab (7) is formed on the end cap's (2) interior lip to assist in holding the end cap (2) in place. Pre-molded air filter end caps (2) are primarily designed for use in safety air filters (1) for heavy motor vehicle applications, specifically, off road vehicles such as bulldozers, bob cats, transfer trucks, and the like.

14 Claims, 2 Drawing Sheets

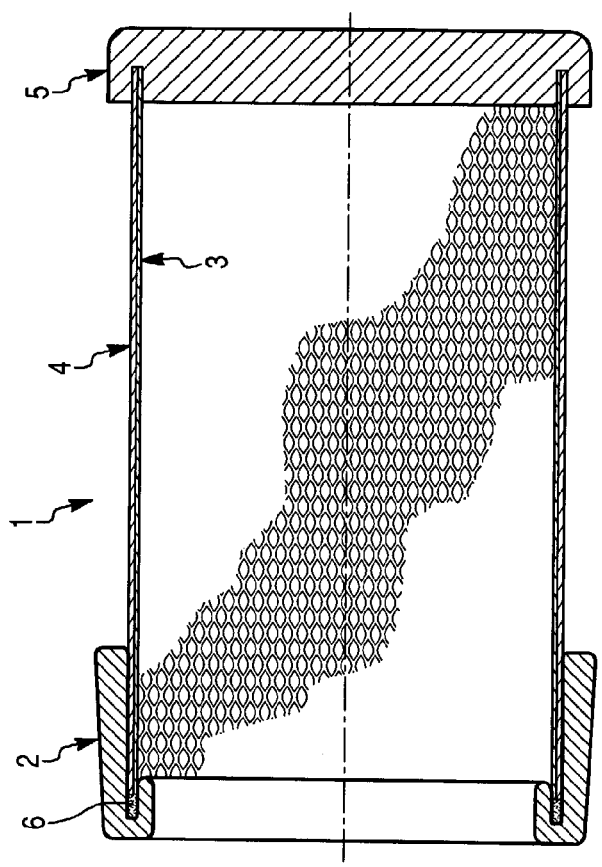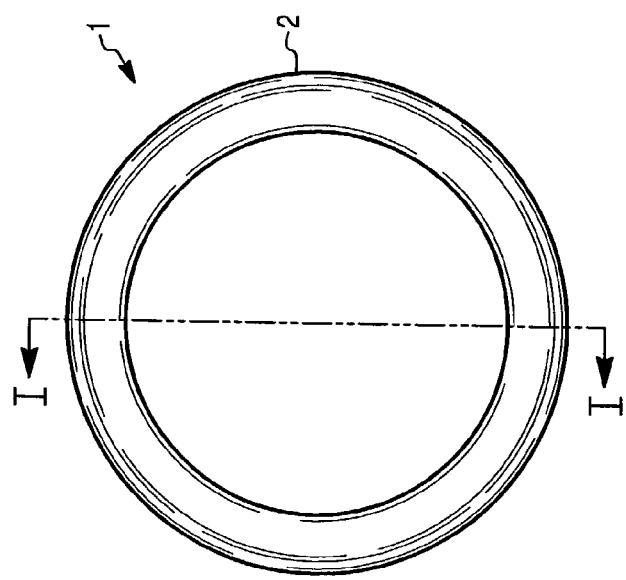

PRE-MOLDED AIR FILTER END CAP AND METHOD OF MANUFACTURING AN AIR FILTER

CROSS REFERENCE TO RELATED APPLICATIONS

None

BACKGROUND OF THE INVENTION

1. Field of the Invention

The invention generally relates to air filters used in reciprocating engines. Specifically, the invention relates to pre-molded one-piece end caps for safety air filter elements installed in reciprocating engines used for heavy off-road applications, such as bulldozers, skid steer loaders, transfer trucks, etc.

2. Description of the Background Art

In heavy off-road applications, a typical air filter assembly comprises a first or outer air filter designed to clean the air of most substances that would damage the engine. A second, or "safety" air filter is positioned concentrically within, or down stream, of the first air filter to further filter any contaminates that make it past the first filter, should the first or outer filter become compromised and allow the passage of unfiltered air. The safety air filter also provides air inlet protection while the first or outer filter is changed.

A typical safety air filter assembly comprises a cylindrical filter body of wire mesh, fiberglass, or metal supporting structure, fixedly attached to a filter media, such as paper, foam, plastic, or any combination thereof. A first end of the filter assembly is comprised of soft pliable material, such as polyurethane. The soft material is molded integrally with the cylindrical expanded core and filter media. An opposite or second end of the filter body is comprised of a structurally rigid and substantial material, such as metal, fiberglass, or hard plastic.

Currently, the molding process required to manufacture the first pliable end of the filter is relatively expensive, time consuming, and may provide an inferior bond between the end cap and the body of the filter. In order to address these deficiencies, the present invention has been developed. The invention may be used in any filter system, but is designed primarily for the end caps of safety air filters in heavy off-road vehicles. In operation, the filter functions to ensure that the air-flow path into an engine is always protected, while at the same time minimizing air filter production costs.

SUMMARY OF THE INVENTION

The invention comprises a substantially cylindrical filter media and permeable core; and an end cap secured to a first end of the filter media and the permeable core. The end cap has an end portion with a substantially "U" shaped cross-section forming an annular groove for receiving the first end of the filter media and the permeable core, wherein the end cap is formed prior to securing the end cap to the first end.

The use of a one-piece pre-molded end cap lowers manufacturing costs, and improves filter reliability and wears characteristics. The filter end cap is primarily designed for heavy motor vehicle applications, specifically, off road vehicles such as bulldozers, skid steer loaders, transfer trucks, and the like.

BRIEF DESCRIPTION OF THE DRAWING

FIG. 1 is an end view of the pre-molded end cap, showing the section I—I.

FIG. 2 is a sectional view of the pre-molded end cap in FIG. 1, sectioned along the line I—I. FIG. 2 shows the pre-molded end cap, as installed in the end of a safety air filter.

FIG. 3 specifically illustrates the pre-molded end cap's locking tab, which helps hold the cap in place.

DETAILED DESCRIPTION OF THE INVENTION

Figure 3:
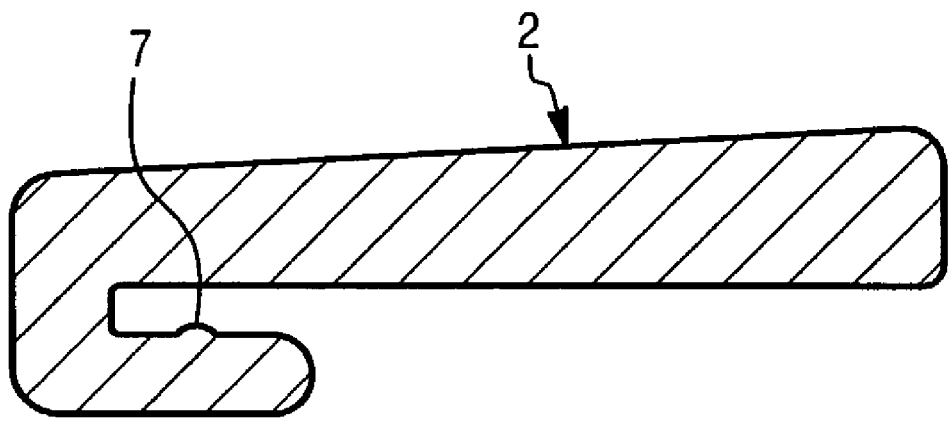
FIG. 3 is an enlarged view of the pre-molded end cap shown in FIGS. 1 and 2.

An embodiment of the present invention will now be described with reference to the accompanying drawing. It should be noted that the terms "front", "rear", "left", "right", "upper", and "lower", relate to directions as viewed in the drawings, but may not be applicable to the invention when installed in a specific application.

FIG. 1 discloses an end view of the safety air filter assembly (1) and pre-molded end cap (2). After passing through a first or outer filter, engine intake air flows through the filter media of the cylindrical safety air filter assembly (1), and into the open center of the filter (1). The intake air then flows on to the combustion section of the engine.

FIG. 2 discloses a safety air filter assembly (1) comprising a pre-molded end cap (2) connected to a first end of the filter assembly (1). The end cap (2) is comprised of soft, pliable material selected to insure a good seal with a rigid connecting member (not shown). The end cap (2) may be comprised of pre-molded rubber, or a pre-molded plastic, such as polyurethane, or other suitable materials. The end cap (2) is directly attached to an expanded core or wire mesh (3), and a filter media (4) by an adhesive (6). A rigid structural end cap (5) at a second or opposite end of the filter assembly (1) secures the opposing end of the expanded metal core (3) and filter media (4). The rigid end cap (5) may comprise a connecting system for connecting the second end of the filter assembly (1) to an airflow assembly or support mechanism.

FIG. 3 discloses the end cap (2) in greater detail. Specifically, FIG. 3 discloses a locking tab (7) on the interior lip of the "U" shaped portion of the end cap (2). The locking tab (7) and adhesive (6) secure the end cap (2) to the filter assembly's (1) expanded core (3) and filter media (4).

The filter manufacturing process is initiated by pre-molding the end cap (2), and then filling the U-shaped portion of the end cap (2) with adhesive (6). The end cap (2) is then slipped over the exposed circular end of the expanded core (3) and filter media (4).

This process is an improvement over the previous method, which required a complex multi-step assembly and curing procedure. The new process produces a superior bond between the end cap and the body of the filter assembly, and it also reduces the time required to manufacture a filter assembly because the improved process requires virtually no cure time.

For the foregoing reasons, it is clear that the invention provides an improved safety air filter end cap, and method of manufacturing a safety air filter assembly. The invention, as described, may be modified in multiple ways and applied in various technological applications. For example, in addition to conventional off-road applications, the end cap and filter assembly may be used in nautical and aeronautical applications, or on any stationary or mobile power units or generators. Similarly, although the materials of construction are generally described, they may also include a variety of compositions consistent with the function of the invention. Such variations are not to be regarded as a departure from the spirit and scope of the invention, and all such modifications as would be obvious to one skilled in the art are intended to be included within the scope of the following claims.

We claim:

1. A filter assembly (1) for providing a safety air filter arrangement disposed within a primary outer air filter assembly, said safety filter arrangement filtering air when the primary outer filter is being serviced, said filter assembly comprising:

a substantially cylindrical filter media (4) and permeable core (3) circumscribing a longitudinal axis; and an end cap (2) secured to a first end of said filter media (4) and said permeable core (3);

said end cap (2) having an end portion with a substantially "U" shaped cross-section forming an annular groove for receiving said first end of said filter media (4) and said permeable core (3), said "U" shaped cross-section defining an inner lip and an outer lip wherein said inner lip is shorter than said outer lip, wherein said end cap (2) is formed prior to securing said end cap (2) to said first end.

2. The filter assembly (1) of claim 1 further comprising, a locking tab (7) formed on an inner lip of said "U" shaped portion of said end cap (2).

3. The filter assembly (1) of claim 1 wherein said end cap (2) is secured to said first end by adhesive.

4. The filter assembly (1) of claim 1 wherein said end cap (2) is comprised of one continuous unitary element molded of a pliable material.

5. The filter assembly (1) of claim 1 further comprising a second end having a rigid end cap (5) comprised of a structurally solid material, selected from the group consisting of metal, fiberglass, hard plastic and rubber.

6. The filter assembly (1) of claim 1, wherein said permeable core (3) is comprised of metal, fiberglass, or hard plastic.

7. A method of manufacturing a filter assembly (1) for providing a safety air filter arrangement disposed within a primary outer air filter assembly, said safety filter arrangement filtering air when the primary outer filter is being serviced, said filter assembly comprising, a substantially cylindrical filter media (4) and permeable core (3) assembly, and an end cap (2) attached to a first end of said assembly (3, 4), said method comprising the steps of:

(a) providing said end cap (2) having an annular groove for receiving said first end of said assembly (3, 4), said annular groove defining an inner lip and an outer lip for said end cap (2) wherein said outer lip is longer than said inner lip to define a smooth outer surface providing a sealing interface when said filter assembly is mounted within said primary outer air filter assembly;

(b) providing said first end of said cylindrical assembly (3, 4);

(c) securing said end cap (2) to said first end by inserting said first end into said annular groove.

8. The method of manufacturing a filter assembly (1) described in claim 7, further comprising, coating an interior of said annular groove with adhesive (6) prior to inserting said first end into said annular groove.

9. A method of manufacturing a filter assembly (1) described in claim 7 further comprising, positioning a locking tab (7) within said annular groove of said end cap (2), such that said locking tab (7) secures said first end to said end cap (2).

10. A method of manufacturing a filter assembly (1) described in claim 7, wherein said end cap (2) is comprised of one continuous unitary element molded of a soft pliable material.

11. A method of manufacturing a filter assembly (1) described in claim 7, further comprising the step of securing a rigid end cap (5) to a second end, said rigid end cap (5) comprised of a structurally solid material.

12. A method of manufacturing a filter assembly (1) described in claim 7, wherein said permeable core (3) is selected from the group consisting of metal, fiberglass, and hard plastic.

13. The filter assembly (1) of claim 1, wherein said outer lip comprises a smooth outer surface along an entire length of said outer lip along said longitudinal axis, said smooth outer surface providing a sealing interface when said filter assembly is mounted within said primary outer air filter assembly.

14. The filter assembly (1) of claim 1, wherein said outer lip extends more than twice the length of said inner lip in a direction defined by aid longitudinal axis.

* * * * *